Figure 5:
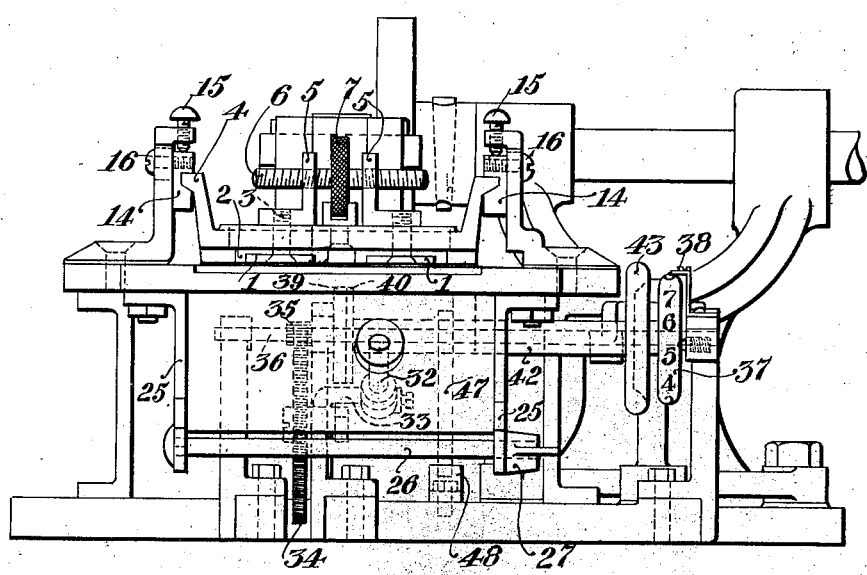

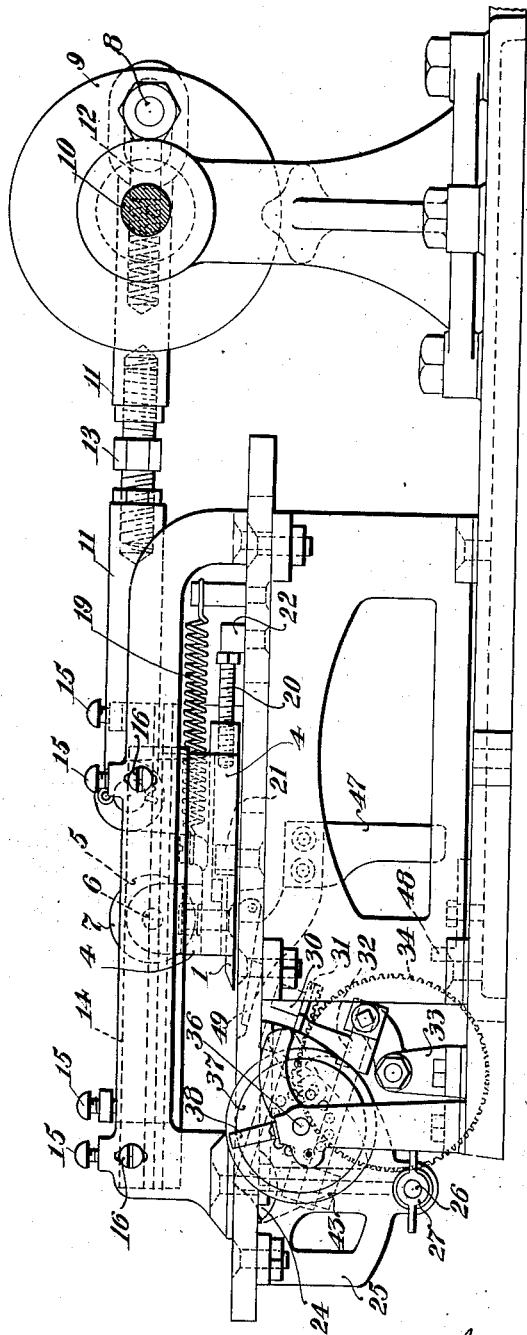

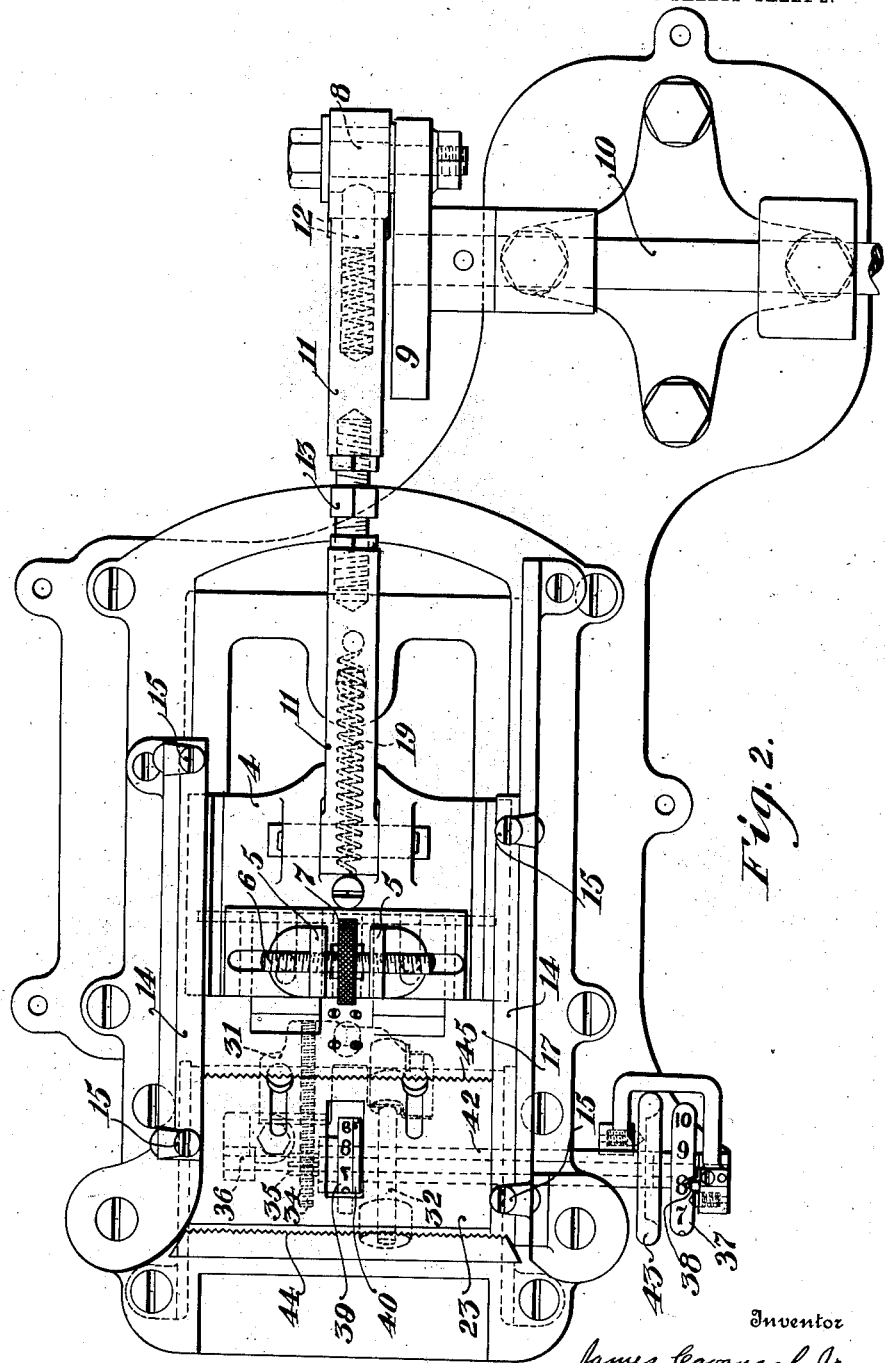

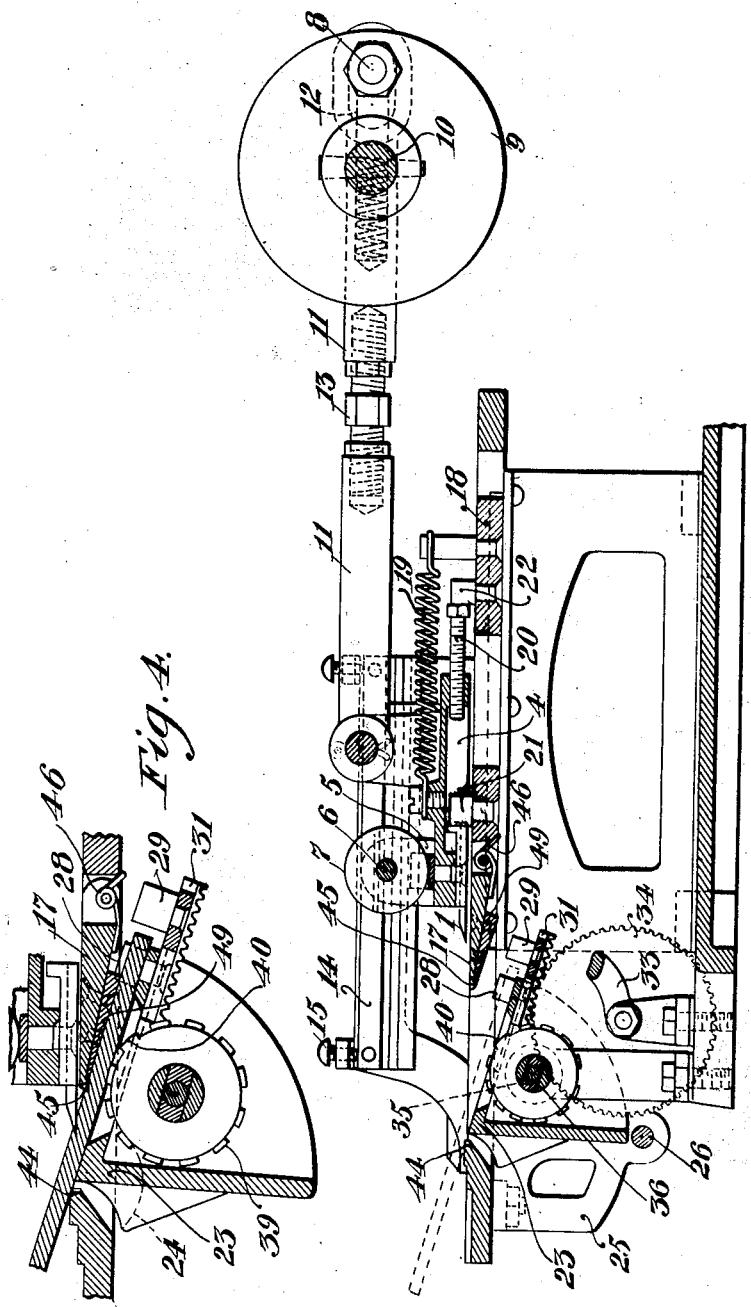

J. CAVANAGH, Jr.
MACHINE FOR OPERATING ON INSOLES.
APPLICATION FILED JULY 19, 1907.

1,113,541.

Patented Oct. 13, 1914.
5 SHEETS—SHEET 4.

Witnesses
Inventor
James Cavanagh Jr.
By
Phillips Van Everen & Fish
Attorney

J. CAVANAGH, Jr.
MACHINE FOR OPERATING ON INSOLES.
APPLICATION FILED JULY 19, 1907.

1,113,541.

Patented Oct. 13, 1914.
5 SHEETS—SHEET 5.

Witnesses
E. C. Wunderman
M. L. Gilman.

Inventor
James Cavanagh Jr.
By Phillips, Van Everen & Fish
Attorney

UNITED STATES PATENT OFFICE.

JAMES CAVANAGH, JR., OF BOSTON, MASSACHUSETTS, ASSIGNOR TO UNITED SHOE MACHINERY COMPANY, OF PATERSON, NEW JERSEY, A CORPORATION OF NEW JERSEY.

MACHINE FOR OPERATING ON INSOLES.

1,113,541.   Specification of Letters Patent.   Patented Oct. 13, 1914.

Application filed July 19, 1907. Serial No. 384,511.

*To all whom it may concern:*

Be it known that I, JAMES CAVANAGH, Jr., a citizen of the United States, residing at Boston, in the county of Suffolk and State of Massachusetts, have invented certain new and useful Improvements in Machines for Operating on Insoles; and I do hereby declare the following to be a full, clear, and exact description of the invention, such as will enable others skilled in the art to which it appertains to make and use the same.

The present invention relates to machines for operating on insoles and more particularly to a machine adapted to form transverse slits extending part way only through the thickness of an insole at the points where the stitch receiving rib begins and ends.

In the manufacture of insoles and particularly of insoles for welted shoes, a stitch receiving rib is formed on one surface of the sole extending throughout that portion of the sole which is to receive the inseam by which the insole is attached to the welt and upper of the shoe. This stitch receiving rib is formed by slitting the edge of the insole and turning up a portion thereof to form a lip or by slitting the edge of the insole and also cutting a channel in the insole, or by cutting a channel in the insole and forming a shoulder on the outer edge of the insole by removing a skiving therefrom. On account of the difficulty of entering the rib forming knife or knives into the insole and removing them therefrom, and also on account of the fact that there is nothing on the surface of the insole to guide the operator in determining the points at which the stitch receiving rib should begin and end, the rib forming knife or knives are usually entered into and removed from the sole upon the heel portion of the sole, so that the stitch receiving rib extends on to the portion of the sole which forms the heel seat. This not only weakens the heel seat but in the case of a sole provided with an upturned lip cut from the edge of the sole, necessitates slitting the lip at a subsequent operation at the points where the inseam should begin and end, and also necessitates turning back the lip upon the heel seat.

The principal object of the present invention is to provide an improved machine by which transverse cuts can be formed in an insole at predetermined distances from the heel end of the sole at the points where the stitch receiving rib begins and ends, said slits extending part way only through the thickness of the sole and preferably being oblique to the surface of the sole and extending toward the toe end of the sole, as thereby no abrupt angle is formed at the junction of the heel and shank portion of the sole, and a better surface is provided to receive the crimped in edge of the counter where the shoe is lasted.

A machine embodying the present invention is intended primarily for operation upon an insole before the sole is subjected to the action of the rib forming knife or knives of an insole channeling or edge splitting machine, the slits made by the machine serving not only to mark the points at which the stitch receiving rib is to begin and end but also serving as an entrance and an exit for the rib forming knife or knives. In its broader aspects, however, the invention contemplates the provision of a machine provided with knives adapted to cut transversely the upturned lip of a lipped insole at predetermined distances from the heel end of the sole and thus performs substantially the same operation which has heretofore been performed by hand.

In the manufacture of insoles a strip or sheet of canvas or other suitable reinforcing material is often applied to the ribbed surface of the insole. In applying this reinforcing material to the insole. the insole is placed upon the sheet of reinforcing material with its unribbed surface uppermost, and since there is no mark on the surface of the insole to indicate the points at which the stitch receiving rib begins and ends, the reinforcing material is not uniformly applied to different soles, and often the reinforcing material extends to a considerable distance beyond the ends of the stitch receiving rib and upon the heel seat of the sole.

To enable the reinforcing material to be applied properly and in a uniform manner to insoles, a feature of the present invention contemplates the provision, in a machine for operating upon insoles, of means for marking the unribbed surface of the sole at a predetermined point with relation to the ends of the stitch receiving rib so that these marks may serve as a guide when the reinforcing material is applied.

The present invention also contemplates the provision, in a machine for operating upon insoles, of improved means for marking the ribbed surface of the insole at predetermined points with relation to the ends of the stitch receiving rib to serve as a guide to the operator of the inseam sewing machine and also to the operator who cuts off or butts the ends of the welt.

In addition to the features of invention above referred to the machine hereinafter described as embodying the preferred form of the present invention also embodies certain novel constructions and arrangements of parts, such for instance as a novel presser foot for holding the work and means for operating it, means for regulating the depth of the slits made by the knives in soles of different thickness, means for adjusting the slitting knives for operation on soles of different sizes, means for determining the position of soles of different sizes with relation to the knives, means for supporting the sole whereby the slits are formed in a direction inclined to the surface of the sole, and means for marking the size number of the sole upon one surface thereof.

The various features of the present invention will be clearly understood from an inspection of the accompanying drawings in which—

Figure 6:
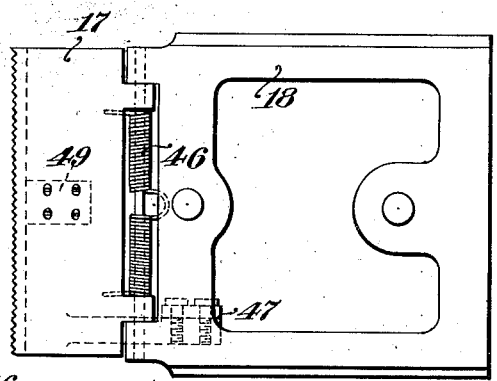
Figure 7:
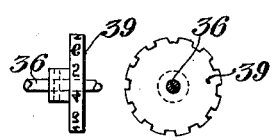
Figure 8:
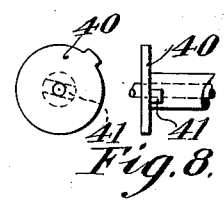
Figure 9:
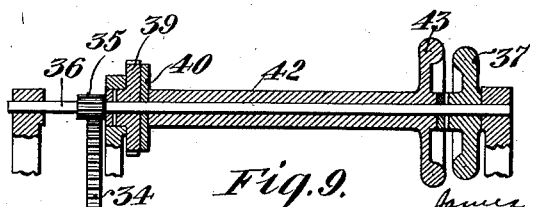
Figure 10:
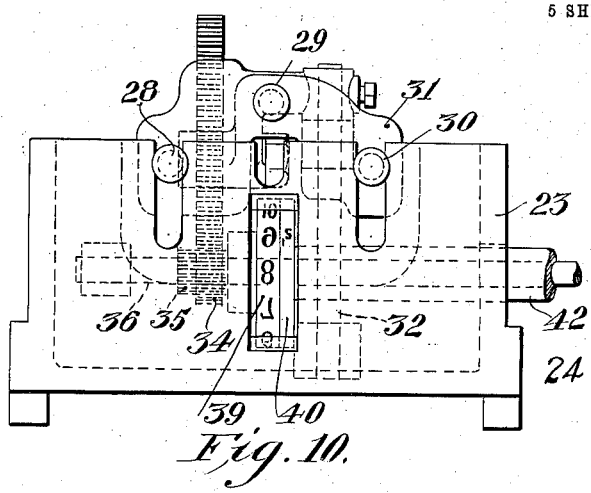
Figure 11:
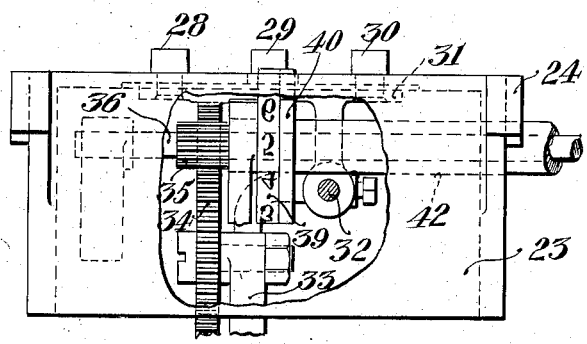
Figure 12:
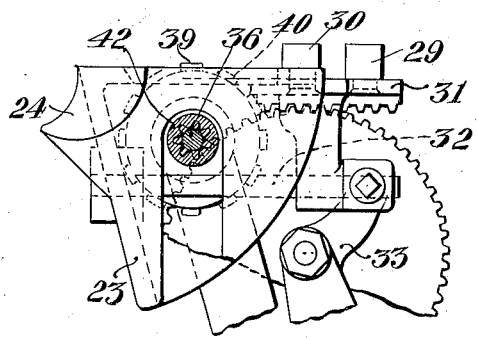

Figure 1 is a view in side elevation of a machine for operating upon insoles embodying the same in their preferred form, Fig. 2 is a plan view of the machine, Fig. 3 is a central longitudinal section, Fig. 4 is a detail sectional view illustrating certain of the parts shown in Fig. 3 on a somewhat larger scale but with the parts in the position they assume when the slitting knives are in the insole. Fig. 5 is a view in front elevation of the machine. Fig. 6 is a detail plan view of the presser foot and the reciprocating slide upon which it is mounted. Fig. 7 shows in side and end elevation one of the wheels which marks the size number upon the sole. Fig. 8 is a side and end elevation of the wheel which coöperates with the wheel illustrated in Fig. 7 to mark the size numbers on the sole. Fig. 9 is a detail sectional view illustrating the mechanism for setting the marking wheels and a portion of the mechanism for actuating the sole gages. Fig. 10 is a plan view of the work support and of the parts associated therewith. Fig. 11 is a view in front elevation of the parts illustrated in Fig. 10 with a portion of the work support broken away to show underlying parts and Fig. 12 is a view in side elevation of the parts illustrated in Figs. 10 and 11.

The sole slitting knives, two in number, are indicated at 1 and each knife is mounted in a separate block 2 and adjustably secured therein by means of a bolt 3 passing through a slot in the knife and through the block, the provision of the slot in the knife permitting the knife to be adjusted longitudinally. The blocks 2 are mounted upon the under side of a reciprocating slide 4 and are secured to the slide by the bolts 3 which extend upwardly through transverse slots in the slide and screw into L-shaped blocks 5 on the upper side of the cross head. By this construction the bolts 3 act to secure the slitting knives 1 in the blocks 2 and also act to clamp the blocks 2 and 5 to the slide. The provision of the transverse slots in the slide 4 permits the blocks 2 and 5 and the slitting knives to be adjusted transversely toward and from each other to adapt the knives for operation upon soles of different sizes. To enable the knives to be adjusted accurately and simultaneously, the upwardly extending portions of the blocks 5 have a screw-threaded engagement with an adjusting screw 6 provided with right and left threads and having secured thereto between the blocks a knurled disk 7 by which the screw can be conveniently rotated. The screw is held from longitudinal movement by lugs projecting upwardly from the slide 4 upon each side of the disk.

The slitting knives are caused to slit the insole, placed in the machine, by mechanism which reciprocates the slide 4. This mechanism, as illustrated, consists of a crank pin 8 mounted in a disk 9 on the driving shaft 10 of the machine, and a link 11 connecting the crank pin and the slide. The support for the insole is stationary during the operation of the machine, as will be hereinafter described, and to enable the depth of the cuts made in soles of different thicknesses to be regulated, a yielding connection is provided in the mechanism for actuating the slide 4, so that the slide can be advanced different distances for different thicknesses of soles. As illustrated this yielding connection is provided between the link 11 and the crank pin 8, and to this end the link 11 is provided with a slot through which the crank pin extends and a spring pressed plunger 12 is provided in the link, which bears against the crank pin and tends to move the link so that the crank pin is in engagement with the outer end of the slot. For convenience in assembling the parts and to enable the cross head and the parts of its actuating mechanism to be brought into the desired position, the link 11 is preferably made in two parts and connected by an adjusting screw 13 provided with right and left threads engaging respectively the two parts of the link. To enable the slide 4 to be adjusted in a direction perpendicular to the plane in which the slitting knives cut so as to bring the cutting edges into the desired plane, the guides 14 which are engaged by the upwardly projecting edges of the slide, are mounted upon the frame of the machine so as to be capable of vertical adjustment, as best shown in Fig. 5, adjusting screws 15 being provided which bear upon the upper surface of the guides, and locking screws 16 which pass through vertical slots in the frame and screw into the guides. The insole is held clamped in position on the work support of the machine during the cutting action of the slitting knives by means of a presser foot, indicated at 17. This presser foot is mounted upon a slide 18 which reciprocates in guideways in the machine frame parallel to the guideways for the slide 4. A spring 19 connects the slides 4 and 18, so that during the forward stroke of the slide 4 the slide is moved forward by the spring 19 until the presser foot is brought into engagement with the sole, after which the spring 19 yields and the slide 18 and the presser foot 17 mounted thereon remain stationary during the continued forward movement of the slide 4 and the slitting knives. The relative position of the presser foot and slitting knives at the limit of the forward stroke of the knives is indicated at Fig. 4.

In the machine illustrated in the drawings the depth of the cuts produced by the slitting knives in soles of different thicknesses is regulated by means of the slide 18 which carries the presser foot and which is yieldingly connected to the knife carrying slide 4. The slide 4 is provided with an adjustable stop screw 20 mounted in a downward projection from the rear end of the slide, and the forward end of this screw is arranged to engage a pin 21 on the slide 18, after the slide 18 has been stopped by the engagement of the presser foot with the sole. The engagement of the screw 20 with the pin 21 limits the forward movement of the knife carrying slide 4 and thus the slitting knives are allowed to project only a predetermined distance ahead of the presser foot regardless of the thickness of the sole being operated upon. The yielding connection between the crank pin 8 and the link 11 permits the knife carrying slide to be stopped by the engagement of the screw 20 with the pin 21, the spring plunger 12 yielding as soon as the forward movement of the knife carrying slide is stopped. During the backward movement of the knife carrying slide the movement of the slide 18 with relation to the knife carrying slide is limited by the engagement of the set screw 20 with a pin 22 on the slide 18.

The support upon which the sole is held during the operation of the machine is indicated at 23 and consists of a casting comprising a plate upon which the sole rests and which is arranged obliquely to the path of movement of the sole slitting knives, a front plate extending downwardly substantially at right angles to the path of movement of the sole slitting knives and end plates connecting the sole supporting plate and front plate. At its ends this casting is provided with projections 24, best shown in Figs. 10, 11 and 12, which projections are received in suitably shaped recesses in the frame of the machine. The casting is secured in position between brackets 25 projecting downwardly from a stationary part of the machine frame, which brackets are forced toward each other to clamp the casting by means of a bolt 26 connecting the brackets, and a nut 27 having a screw-threaded engagement with one end of the bolt.

The position of the sole on the sole support is determined by adjustable gage pins 28, 29 and 30, which are arranged to engage the heel end of a sole placed in a machine. These gage pins project upwardly from a slide 31 and are adapted to move in slots formed in the work support. Ordinarily the heel end of the sole is engaged by the pins 28 and 30. With the smallest sizes of soles, however, the heel end of the sole engages the pin 29 as well as the pins 28 and 30 and is thus prevented from passing backward. The slide 31 is mounted to move beneath the sole supporting plate of the work support and is supported upon a rod 32 which passes through a projection from the slide. The rod 32 is supported by the front plate of the work support and by a stationary bracket 33. To enable the slide 31 to be adjusted for different sizes of soles it is provided upon its lower surface with a rack 105 which is engaged by a gear 34, which gear meshes with a pinion 35 secured to a shaft 36. The shaft 36 is journaled in stationary brackets and is provided at one end, in a position where it is readily accessible to the operator, with a disk 37 by which it may be rotated. This disk is provided upon its periphery, as indicated in Fig. 5, with numerals indicating the different sizes of soles, and a stationary bracket in which the shaft 36 is mounted is provided with a stationary pointer 38, which coöperates with the figures on the disk to indicate the position of the gage pin carrying slide 31.

The machine illustrated in the drawings is provided with means for marking the size numbers upon the sole, this means consisting of a number wheel 39 for marking the whole sizes and a number wheel 40 coöperating therewith to mark fractional sizes. The wheel 39 is fixed to the shaft 36 so as to rotate therewith and is so located that its periphery projects through a slot formed in the center of the sole supporting plate of the work support. The numbers on the wheel 39 are so arranged that when the disk 37 and shaft 36 are actuated to set the gage pin carrying slide 31 for a given size of sole, the corresponding number on the wheel 39 is brought into position to engage the surface of the sole placed on the sole support. The number wheel 40 for indicating fractional sizes is mounted at one side of the wheel 39 upon the shaft 36 and is secured, by a projection 41 from its hub, to the end of a sleeve 42 mounted upon the shaft 36 and provided with a hand wheel 43 adjacent the disk 37. The number wheel 40 is provided with a single projection on its periphery bearing the numeral ½ so that by rotating the sleeve 42 the numeral on the wheel may be moved into and out of a position to coöperate with the wheel 39 in marking the sole.

To mark the unlipped surface of the sole so as to provide a guide for the operator in applying the reinforcing material to the lipped surface of the insole, a series of teeth are formed at 44 upon the stationary portion of the machine frame in front of the work support. This portion of the frame is slightly higher than the front end of the work supporting surface of the work support so that when the sole is forced against the work support, as indicated in Fig. 4, the teeth at 44 are caused to mark the underneath surface of the sole. The marks upon the ribbed surface of the sole to guide the operator of the inseam sewing machine, or the operator who butts the welt, are formed by a series of teeth 45 upon the forward end of the presser foot 17, which teeth are forced into the sole when the presser foot reaches the limit of its forward movement.

The sole supporting surface of the work support is arranged in a plane oblique to that in which the slitting knives cut in order that the slits formed in the sole may extend obliquely toward the toe end of the sole. To avoid any liability of displacement of the sole when the presser foot is brought into engagement therewith and to cause the presser foot to force the sole against the work support with sufficient force to hold it in position and cause it to be marked by the marking wheels and marking devices, the presser foot is pivotally mounted upon the forward end of the slide 18 and means are provided for swinging the presser foot upon its pivot to cause it to press upon the sole in a direction substantially at right angles to the work support. The presser foot is normally held in raised position in line with the slide 18 by means of a spring 46 coiled about its pivot. An arm 47 projects downwardly from the presser foot and the lower end of this arm is arranged to be engaged by a stationary adjustable projection 48 just before the slide 18 reaches the limit of its forward movement. The arm 47 is thus caused to swing the presser foot downwardly about its pivot and the presser foot is caused to exert a pressure upon the sole in a direction substantially at right angles to its surface. A hardened wearing plate 49 is provided on the lower surface of the presser foot in a position to engage the sole directly opposite the marking wheels 39 and 40.

The operation of the machine above described will be clearly understood by those skilled in the art from the description above given of the construction and arrangement of its various parts, it being understood that suitable means are provided for applying power to the driving shaft 10 and means whereby the shaft can be thrown into and out of operation.

The nature and scope of the present invention having been indicated and a machine embodying the several features thereof in their preferred form having been specifically described, what is claimed is:—

1. A machine for operating on insoles, having in combination separated sole slitting knives, means for causing the knives to cut transverse slits extending part way only through the sole at the points where the stitch receiving rib begins and ends, gaging and supporting means for the sole, and means acting automatically to regulate the depth of said slits in soles of different thickness.

2. A machine for operating on insoles, having in combination separated sole slitting knives, means for causing the knives to cut transverse slits extending part way only through the sole at the points where the stitch receiving rib begins and ends, gaging means for the sole to determine the position of said slits, and means for supporting the sole in a plane inclined to that in which the knives cut.

3. A machine for operating on insoles, having in combination a reciprocating cross head, slitting knives carried thereon, a sole support provided with a supporting surface inclined to the direction of movement of the cross head, a pivotally mounted presser foot movable bodily in the same direction as the cross head to engage the sole, and means for moving the presser foot on its pivot to clamp the sole against the work support.

4. A machine for operating on insoles, having in combination a work support, a reciprocating cross-head, slitting knives thereon, mechanism including a yielding connection for actuating the cross head, and a presser foot arranged to limit the forward movement of the cross head.

5. A machine for operating on insoles, having in combination a work support, a reciprocating cross head, slitting knives thereon, mechanism including a yielding connection for actuating the cross head, and a presser foot yieldingly connected to the cross head arranged to limit the forward movement of the cross head.

6. A machine for operating on insoles, having in combination a work support, a reciprocating cross-head, slitting knives thereon, mechanism including a yielding connection for actuating the cross head, gaging and supporting means for the sole, and means for adjusting said knives for operation upon soles of different sizes.

7. A machine for operating on insoles, having in combination sole slitting knives adapted to cut transverse slits extending part way only through the sole at the points where the stitch receiving rib begins and ends, means for marking the unribbed surface of the sole at predetermined points with relation to said slits, and gaging and supporting means for the sole.

8. A machine for operating on insoles, having in combination, a work support, sole slitting knives having a sole slitting movement toward the work support, a presser-foot, and yielding means for moving the knives and presser-foot toward the work to cause the knives to slit the work and the presser foot to engage the work.

9. A machine for operating on insoles, having in combination, a work support, sole slitting knives, a size marking device, a presser-foot coöperating therewith, and yielding means for actuating said knives and said presser-foot.

10. A sole cutting machine comprising provisions for supporting and positioning the heel portion of a sole, and cutting means arranged for making separated incisions substantially in line with each other in the upper surface of the sole adjacent the edges thereof oblique to the surface of the sole and extending toward the toe end of the sole, leaving the surface between the incisions intact.

In testimony whereof I affix my signature, in presence of two witnesses.

JAMES CAVANAGH, Jr.

Witnesses:
ALFRED H. HILDRETH,
ANNIE C. RICHARDSON.